(12) United States Patent
Suzuki et al.

(10) Patent No.: US 7,353,314 B2
(45) Date of Patent: *Apr. 1, 2008

(54) TIME-OUT CONTROL APPARATUS, TERMINAL UNIT, TIME-OUT CONTROL SYSTEM AND TIME-OUT PROCEDURE

(75) Inventors: Taisaku Suzuki, Hiroshima-ken (JP);
Yoichi Yamamoto, Hiroshima-ken (JP);
Mami Takahashi, Hiroshima-ken (JP);
Yasuo Hamamoto, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 890 days.

This patent is subject to a terminal disclaimer.

(21) Appl. No.: 10/636,707

(22) Filed: Aug. 8, 2003

(65) Prior Publication Data

US 2004/0037233 A1  Feb. 26, 2004

Related U.S. Application Data

(63) Continuation of application No. 09/658,005, filed on Sep. 8, 2000, now Pat. No. 6,728,809.

(30) Foreign Application Priority Data

Sep. 9, 1999 (JP) ................................. 11-255301

(51) Int. Cl.
G06F 13/36 (2006.01)
G08C 15/00 (2006.01)

(52) U.S. Cl. ....................... 710/306; 370/229; 370/252

(58) Field of Classification Search ................ 710/306; 370/229–252

See application file for complete search history.

(56) References Cited

U.S. PATENT DOCUMENTS

| 5,642,409 | A |   | 6/1997  | Kotani et al. |
|-----------|---|---|---------|---------------|
| 5,758,057 | A | * | 5/1998  | Baba et al. .................... 714/7 |
| 5,828,847 | A |   | 10/1998 | Gehr et al. |
| 6,041,352 | A | * | 3/2000  | Burdick et al. ............. 709/224 |
| 6,076,114 | A | * | 6/2000  | Wesley ........................ 709/235 |
| 6,178,449 | B1 | * | 1/2001  | Forman et al. ............. 709/224 |
| 6,269,084 | B1 | * | 7/2001  | Takei .......................... 370/248 |

(Continued)

FOREIGN PATENT DOCUMENTS

JP   11-055297   2/1999

*Primary Examiner*—Glenn A. Auve
*Assistant Examiner*—Nimesh G Patel
(74) *Attorney, Agent, or Firm*—McDermott Will & Emery LLP

(57) ABSTRACT

The present invention is built on a time out control apparatus to control the time out when a packet is transferred between terminal units connected to different buses. In the time out control apparatus, delay measuring means measures the delay time required for a response packet to be received after a request packet is sent to a terminal unit (control unit) connected via a bus. Delay information list generating means generates a delay information list in which the delay times measured by the delay measuring means are related to the individual identification information on the respective terminal units. Information output means reads out the delay time from the delay information list in accordance with a request from the terminal unit and outputs the delay time to the terminal unit. This sets the delay time on the time out register of the terminal unit.

11 Claims, 18 Drawing Sheets

U.S. PATENT DOCUMENTS

| | | | |
|---|---|---|---|
| 6,405,337 B1 * | 6/2002 | Grohn et al. | 714/749 |
| 6,542,468 B1 * | 4/2003 | Hatakeyama | 370/238 |
| 6,546,014 B1 * | 4/2003 | Kramer et al. | 370/395.41 |
| 6,880,025 B2 * | 4/2005 | Toguchi et al. | 710/104 |
| 7,143,184 B1 * | 11/2006 | Shah et al. | 709/241 |
| 2002/0057655 A1 * | 5/2002 | Staats | 370/256 |
| 2005/0041581 A1 * | 2/2005 | Kuusinen et al. | 370/230 |
| 2007/0047440 A1 * | 3/2007 | Meyer et al. | 370/231 |

* cited by examiner (a)

213 WRITE REQUEST PACKET (b)

214 RESPONSE PACKET (a)

(b)

TIME-OUT CONTROL APPARATUS, TERMINAL UNIT, TIME-OUT CONTROL SYSTEM AND TIME-OUT PROCEDURE

This application is a continuation of application Ser. No. 09/658,005 filed Sep. 8, 2000 now U.S. Pat. No. 6,728,809. Priority of application Ser. No. 11-255301 filed on Sep. 9, 1999, in Japan is claimed under 35 USC 119. The certified priority document was filed in Ser. No. 09/658,005 on Sep. 8, 2000.

FIELD OF THE INVENTION

The present invention relates to a time out control apparatus to connect a plurality of physically separated buses to each other, and a time out procedure in a time out control system.

BACKGROUND OF THE INVENTION

The IEEE1394 interface is known as digital interface to transfer such multimedia information as images and voices at a high speed and real-time between the digital cameras and the personal computers.

In this IEEE 1394, up to 63 terminal units (hereinafter referred to as nodes) can be connected to one bus, and the longest length of cable that can connect any two nodes is 4.5 m. All the nodes that are connected to the buses 102 of this IEEE 1394 have each a virtual address space—48-bit address space called CSR address—on a memory 300 built in the terminal unit 100 as shown in FIG. 20—and communication between the respective nodes is effected by reading or writing in this address space. The node, in case a request packet requesting to read or write in another node connected to the same bus is sent, sets the timer with a value as timer value—a value set at a split time out register (SPLIT_TIMEOUT REGISTER) 310 (hereinafter referred to as time out register) located at a specific place in the address space of the memory of the own node. It is so arranged that in case the timer times out before a response packet is received from the destination node of the request packet (hereinafter referred to as destination node), the source node of the request packet (hereinafter referred to as source node) will do necessary time out procedures as re-sending of the request packet.

With a value of 100 ms as initial value, the time out register can be changed from the source node or another node connected to the bus. Generally, the change can be made beforehand within the limit not exceeding the maximum 8 seconds in case the time required for the source node to send a response packet after receiving a request packet exceeds 100 ms.

In case a number of terminal units are used on the IEEE 1394 buses or terminal units are used more than 4.5 m away from a node, a plurality of buses will have to be connected. For connecting the buses to each other, such a bus bridge is needed as disclosed in the Japanese patent application laid open under No. 11-55297 (U.S. patent application Ser. No. 09/130,601).

FIG. 21 shows the relation between a bus bridge 101, two buses 102, 103 and terminal units 100. In this bus bridge 101, when data is transferred from a specific node to another specific node, the node identification (ID) and other necessary parameters at the source are replaced by those at the destination, which makes it possible to transfer data between different buses. Here if, on the bus of the IEEE 1394, a new node is connected to a specific bus or a node connected to a specific node is cut off, the bus will be reset. Each time the bus is reset, new node ID's will be given in accordance with a specific rule.

In case, as set forth above, a plurality of IEEE 1394 buses are connected using the bus bridge to transfer packets between the nodes, the bus bridge will do such procedures as switching from the bus ID of the request packet received from the source node to the bus ID of the bus connected to the destination node so as to send the packets. Also, the response packet received from the destination node is changed in bus ID, and sent to the source node.

In this case, too, the source node reads the time out register value of its own node the same way as above. With this value as timer value, the timer is set. And in case the timer times out before a response packet is received from the node via the bus bridge, such error procedures are taken as re-sending the request packet.

In this connection, it may be suggested that the bus bridge should change in advance the time out register value of the transfer source node, on supposition that the time required to transfer the request packet and transfer the response packet can exceed the time out default value. But it can happen that there are a plurality of nodes that request the bus bridge to transfer the request packets. In the above method, therefore, the bus bridge is to set all the time out registers of transfer source node of request packets in advance, which increases the traffic volume and could hinder ordinary data communication.

Furthermore, the time required for the response packet to be received after the request packet is sent can be different depending on the processing capacity of the transfer destination node and on the condition of the destination node. However, each node has only one time out register, and to avoid time out, the source node has to use the maximum timer value combined of the source node and the destination node. However, to use the same timer value for all transfers presents a processing efficiency problem.

Another problem is that since the bus bridge requires complicated procedures for transfer of the packets, the transfer source node time out register has to set the time with consideration given to the overhead needed for the bus bridge to transfer packets. Furthermore, in case packets are transferred between nodes via a plurality of bus bridges, the overhead can further increase. In such a case, the time required for a response packet to be received after the request packet is sent can exceed the maximum value set on the time out register, which can hinder normal packet communication.

SUMMARY OF THE INVENTION

In view of the prior art described above, including the disadvantages and deficiencies of the prior art, it is an object of the present invention to provide a bus control apparatus, terminal units, bus control system and time out procedure in the bus control system in which time out procedures can be done efficiently in packet communication via a bus bridge.

To effect the object of the invention, the following means are adopted. First, the present invention is built on a time out control apparatus to control the time out when a packet is transferred between terminal units connected to different buses as shown in FIG. 1.

In one aspect, in the time out control apparatus, delay measuring unit 110 measures the delay time required for a response packet to be received after a request packet is sent to a terminal unit (control unit) 117 connected via a bus 102. Delay information list generating unit 111 generates a delay information list 112 in which the delay times measured by the delay measuring unit 110 are related to the individual identification information on the respective terminal units. Information outputting unit 119 reads out the delay time from the delay information list 112 in accordance with a request from the terminal unit and outputs the delay time to the terminal unit. This sets the delay time on the time out register of the terminal unit.

In case the terminal unit is not capable of making a request to the time out control apparatus for the delay time, the information outputting unit 119 reads out the delay time from the delay information list 112 when the delay information list 112 is prepared, and outputs the delay time to the terminal unit.

Furthermore, two arrangements may be used in combination—one in which the terminal unit is capable of requesting the delay time of the time out control apparatus and the other in which the terminal unit is not capable of so doing.

It is so arranged that when a bus reset occurs, the delay measuring unit 110 measures the delay time needed for a response packet to be received in answer to a request packet sent to acquire individual identification information on the terminal unit, thereby generating the delay time in the delay information list.

In addition, it is desired that the delay measuring unit 110 measures the delay time each time the request packets and response packets are transferred a number of times to renew the delay time in the delay information list 112.

In the usual configuration, the time out control apparatus is built in the bus bridge. This ins not restrictive. The bus bridge may be a separate unit. It is desirable that the delay time includes the internal processing time in the bus bridge required to transfer the request and response packets.

In another aspect, the terminal unit includes a timer value acquisition unit 124 that acquires the response time held in the time out control apparatus when the packets are sent to another terminal unit that is connected via the buses. The terminal unit also includes a timer management unit that manages the time out processing in transferring the packets on the basis of the response time acquired from the time out control apparatus.

In a further aspect, a time out control method is provided for controlling the time out in transfer of packets between terminal units connected to buses. The time out control method includes measuring a response time required for a response packet to be received after the sending of a request packet to the terminal units connected via the bus, generating a list by relating to the proper identification information of the respective terminal units connected via the bus to the response time measured by the measuring unit, and outputting the response time read from the list to the respective terminal unit.

BRIEF DESCRIPTION OF THE DRAWINGS

Having summarized the invention, a detailed description of the invention follows with reference being made to the accompanying drawings which form part of the specification, of which.

DESCRIPTION OF THE PREFERRED EMBODIMENTS

Figure 1:
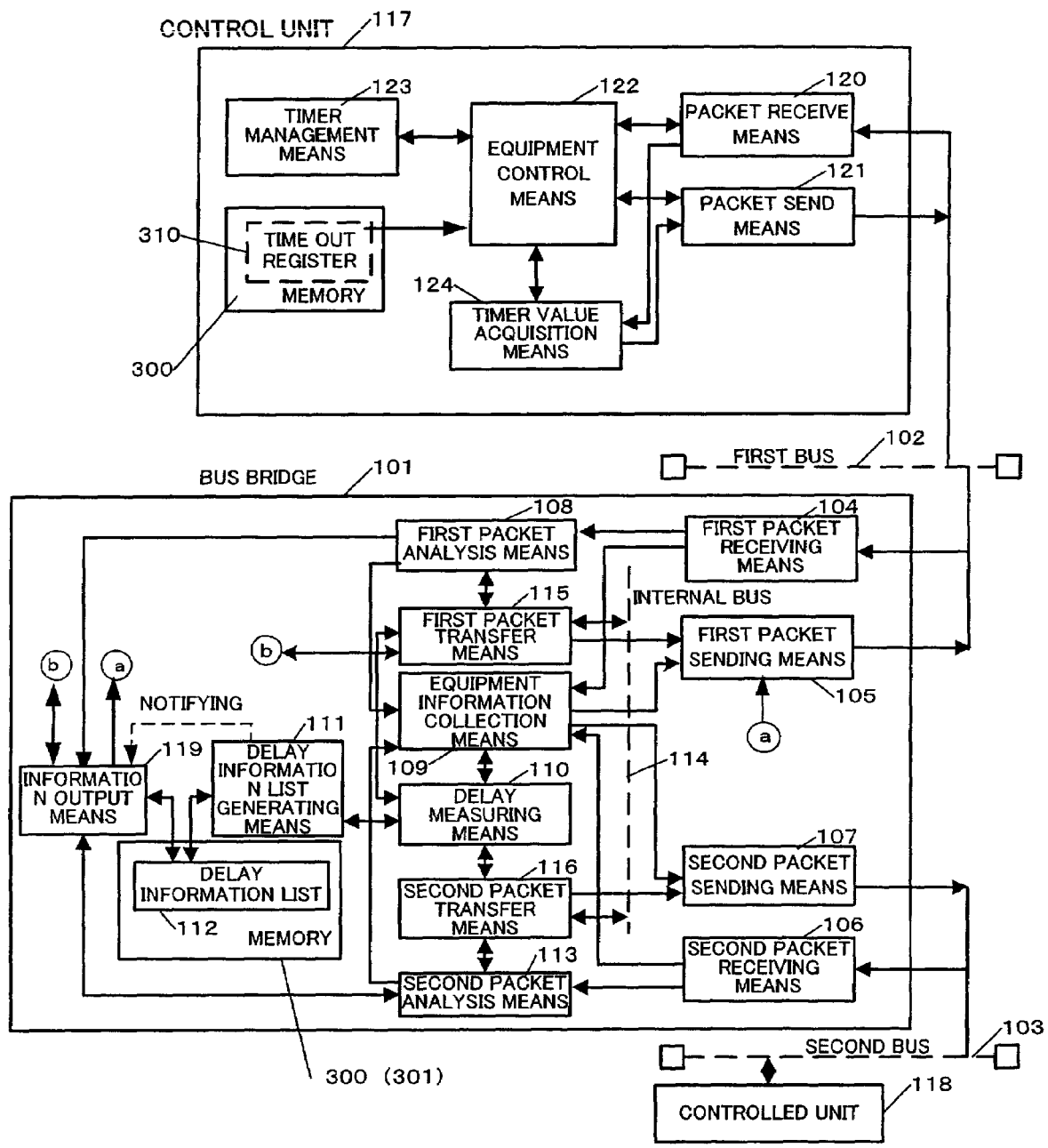
FIG. 1 is a block diagram showing the make-up of the time out control apparatus according to the present invention.

FIG. 1 is a block diagram showing the system make-up of an embodiment and the main make-up of the bus bridge and the control unit. The embodiment will now be described with reference to the drawing.

First, the whole system is so made up that, as shown in FIG. 1, the first bus 102 and second bus 103 in which IEEE 1394 is used are connected to the bus bridge 101 and terminal units are connected to the first bus 102 and second bus 103 as shown in FIG. 1. There will be described the operation when a bus reset occurs in the first bus 102 in that make-up. The same description is applicable to the operation when a bus reset occurs in the second bus 103.

In case a bus reset occurs in the first bus 102, the respective terminal units connected to the bus send self identification (ID) packets to the bus bridge 101. This self ID packet contains physical node ID to identify the terminal units and corresponding transmission rate.

Figure 5:
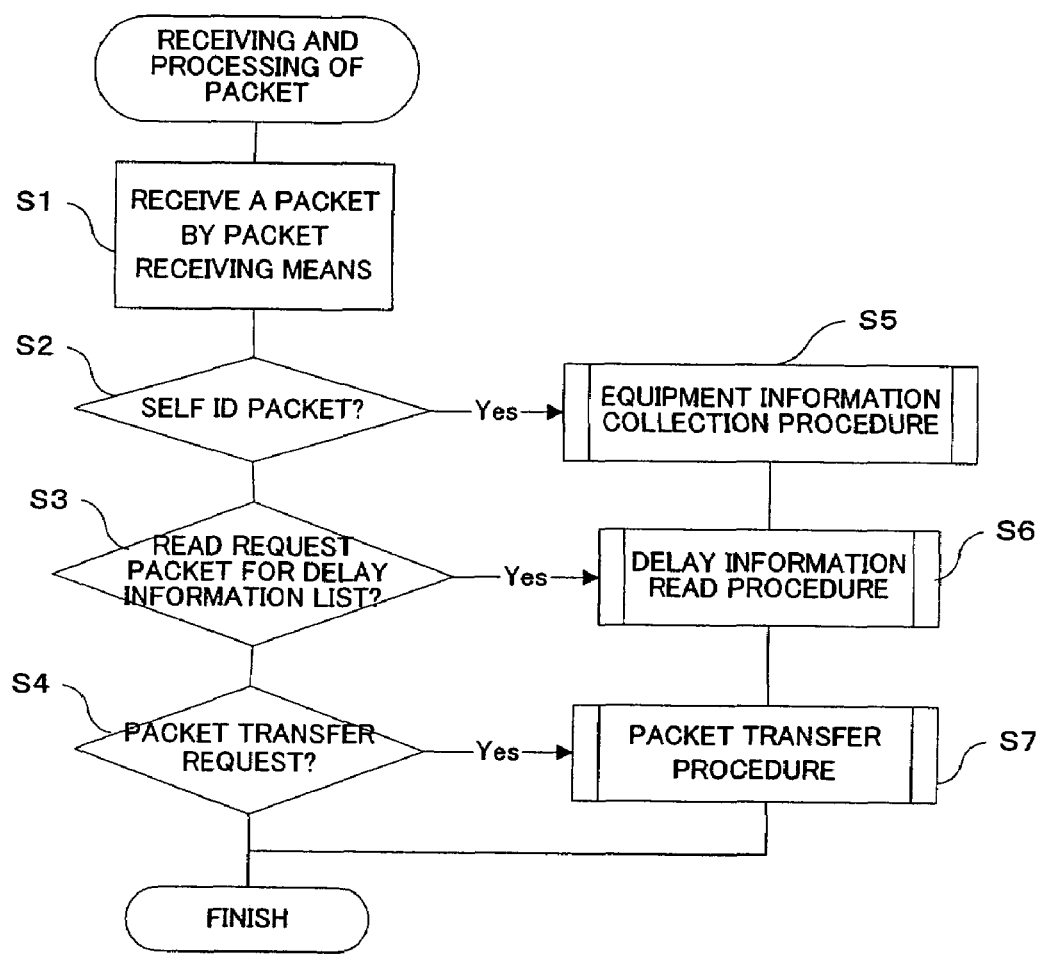
FIG. 5 is a diagram showing the receiving and processing flow of the time out control apparatus according to the present invention.

The self ID packet is received by the first packet receiving means 104 of the bus bridge 101 (FIG. 5, Step S 1), and the type of the packet is analyzed by the first packet analysis means 108 of the bus bridge 101. If the packet received and analyzed by first packet analysis means 108 is found to be a self ID packet, equipment information collection means 109 of the bus bridge 101 is informed of that, and equipment information collection procedure (Step S 5) is done the following way.

Figure 6:
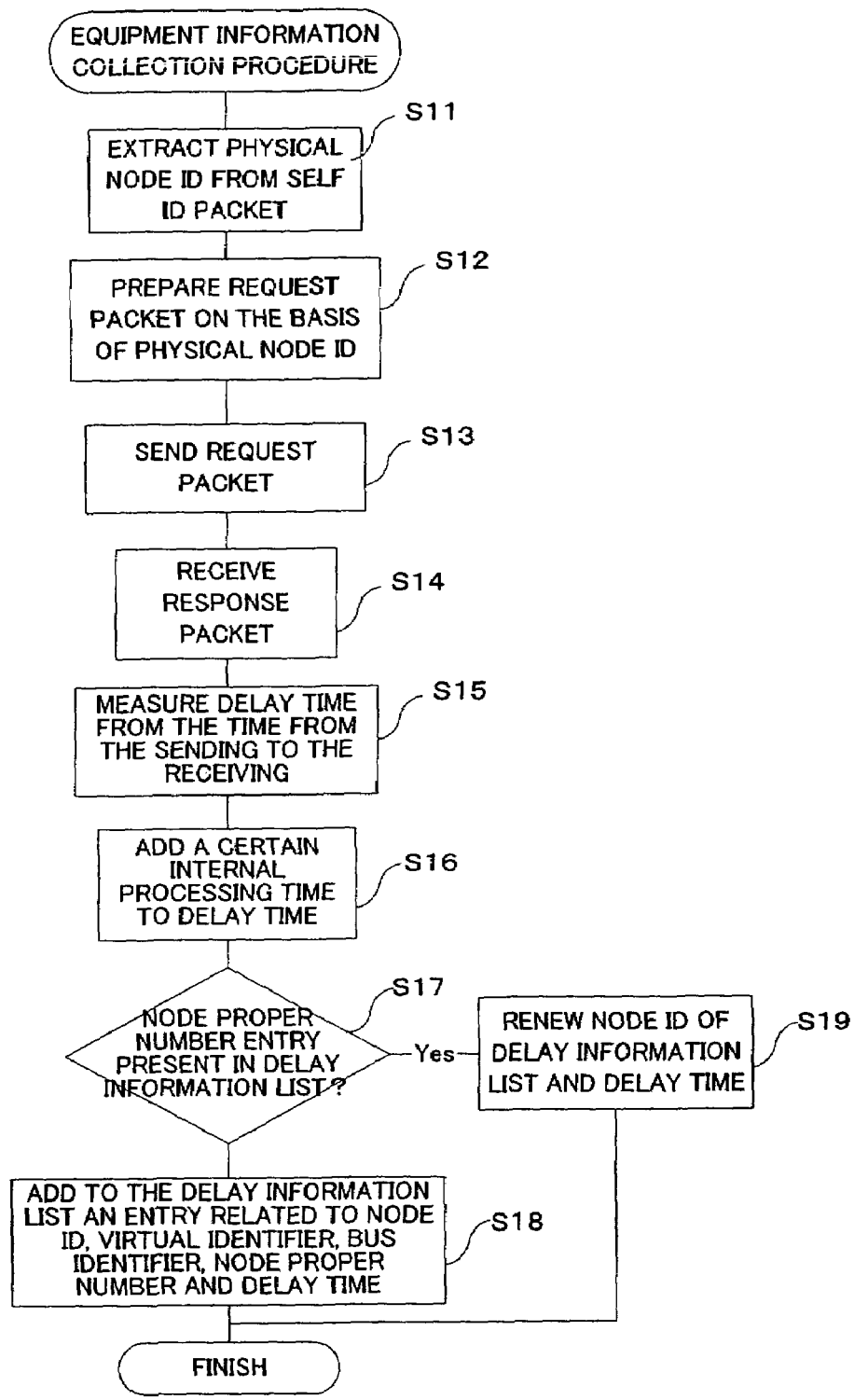
FIG. 6 is a diagram showing the equipment information collection processing flow according to the present invention.

The equipment information collection means 109 extracts the physical node ID from the received self ID packet (FIG. 6, Step S 11), and sends a read request packet to read a configuration ROM (hereinafter referred to merely as ROM) with the individual number peculiar to the terminal unit (node proper number) like the unit ID written therein with the physical node ID as the destination, and receives its response packet, thereby collecting node proper number of the terminal unit. Then, when the request packet is sent, the equipment information collection means 109 registers the destination node ID (made up of the bus ID and the physical node ID of the first bus 102) with the delay measuring means 110. In addition, when the response packet is received, the node ID contained in the response packet is notified to the delay measuring means 110. The delay measuring means 110 measures the delay time required from the registration of the node ID of the destination and the time required for the response packet to be received from the request packet after the request packet is sent. The measurement is made from the registration of the destination node ID to the notification of the time when the response packet is received (FIG. 6 Steps S 13→S 15). Furthermore, the delay measuring means 110 adds a specific internal processing time at the bus bridge 101 to the delay time measured as mentioned above (FIG. 6, Step S 16).

The delay information list generating means 111 prepares a delay information list 112 (FIG. 6, Step S 18) in which 1) the above-mentioned node ID, 2) virtual identifiers the bus bridge 101 gives individually to all the terminal units connected to the bus separately from the node ID, 3) the bus identifiers also given individually to identify the buses, 4) the node proper number read from ROM and 5) the above-mentioned delay time, are related to each other (FIG. 6, Step S 18). Here in case a second or further bus reset occurs, the bus bridge 101 collects information on the respective terminal units connected to the bus the above-mentioned way and also works out the delay time.

Then, the delay information list 112 is searched according to the node proper number. In case the appropriate information is found, the node ID, the bus identifier and the delay time alone are renewed (FIG. 6, Steps S 17→S 19). This way, the same node can always be shown using the same virtual identifier. It is noted that delay information list 112 is located at a specific address in the address space on the memory and the delay time written therein can be read out from the respective terminal units connected to said bus bridge 101 as will be described later.

Figure 4:
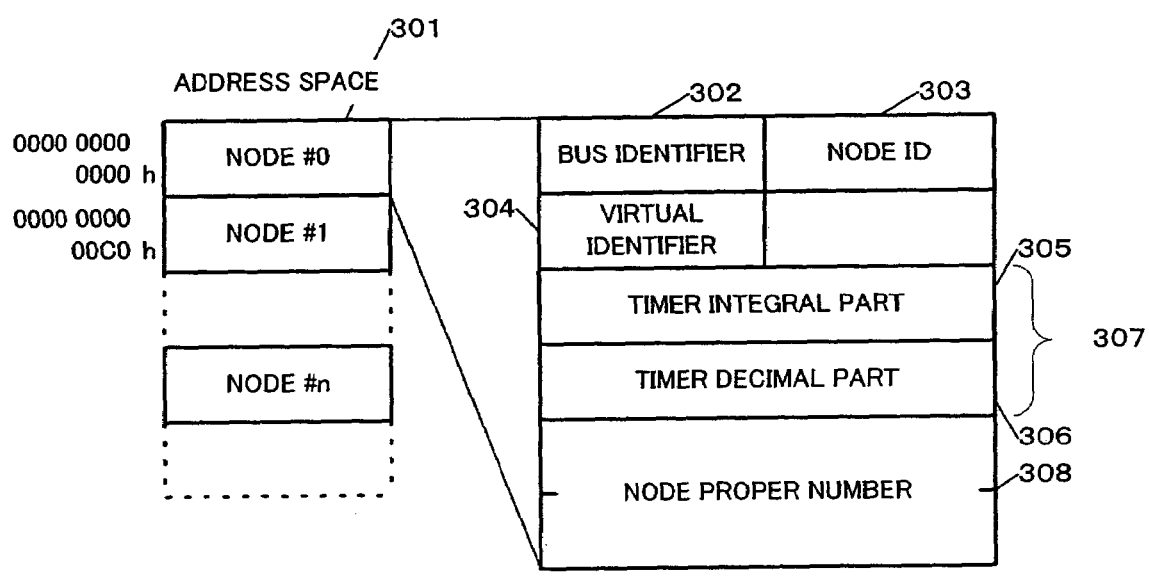
FIG. 4 is a delay information list in an embodiment of the present invention.

The delay information list 112 is located at a specific address in the address space 301 on the memory as shown in FIG. 4, for example, and is made up of a bus identifier 302, the node ID 303, the virtual identifier 304, a timer part 307 to show the delay time by a 32-bit timer integral part 305 and a 32-bit timer decimal part 306, and a node proper number 308. These are present in the same number as the nodes connected to the bus bridge 101. In this case, the least significant 16 bits are effective in the timer integral part 305, and the time can be set at up to 255 seconds. In the timer decimal part 306, the most significant 13 bits are effective. And the timer can be set by ⅛₀₀₀ seconds.

There will now be described the time out procedure when a controlled unit 118, which is connected to the second bus 103, is controlled from the control unit 117 connected to the first bus 102. First, the operation of the control unit 117 will be explained.

Figure 9:
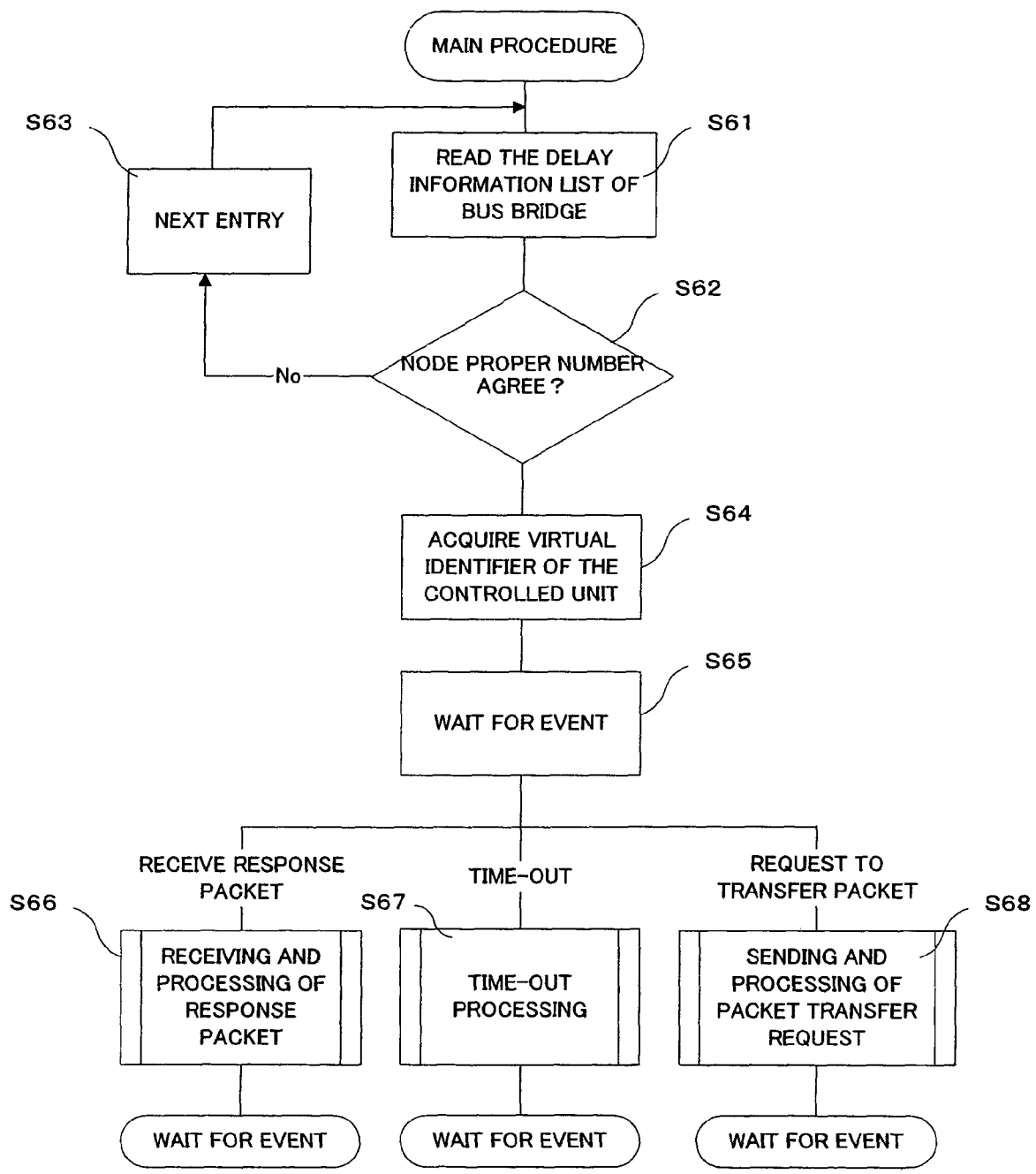
FIG. 9 is a diagram showing the main processing flow of the time out control apparatus according to the present invention.

In the initialization after power is applied, the control unit 117 reads out the delay information list 112 on the bus bridge 101 starting with the head and acquires a virtual identifier that corresponds to the node proper number of the controlled unit 118 (FIG. 9, Steps S 61→S 64). Here, it is understood that the relation between the control unit 117 and the controlled unit 118 is fixed, and the control unit 117 knows the node proper number of the controlled unit 118.

Then, the request packet from the control unit 117 is transferred to the information output means 119 from the first packet receiving means 104 of the bus bridge 101 by way of the first packet analysis means 108. Here, a corresponding virtual identifier is acquired from the delay information list 112, and at the same time, a response packet is generated and sent to the control unit 117 through the first packet sending means 105.

When sending a response packet to the controlled unit 118 (sending of the packet transfer request) (FIG. 9, Step S 68), the control unit 117 reads the delay information list 112 of the bus bridge 101 on the basis of the virtual identifier of the controlled unit 118. Therefore, timer value acquisition means 124 of the control unit 117 first sends to the bus bridge 101 a read request packet 201 as shown in FIG. 2(a) (timer value acquisition) (FIG. 10, Step S 71; FIG. 11, Step S 81).

In this case, the node ID of the bus bridge 101 is specified for the destination ID 203 of the read request packet 201. For the ID 208 at the source, the node ID of the control unit 117 is specified. To be specified for the type 206 is that the type of packet to identify the packet is a request packet 201 to request the delay information list. To the head address 209, an address in the delay information list 112 is specified on the basis of the virtual identifier of the controlled unit 118. To size 210, a seize to read is specified. To a label 204, a value to identify transaction is specified, to an rt 205 retry code and to an pri 207 the priority of packet.

Meanwhile, the bus bridge 101 receives the read request packet 201 and does a procedure—which will be described later—to send a read response packet. By this, the timer value acquisition means 124 of the control unit 117 acquires the delay time of the controlled unit 118 (FIG. 11, Step S 82).

Figure 12:
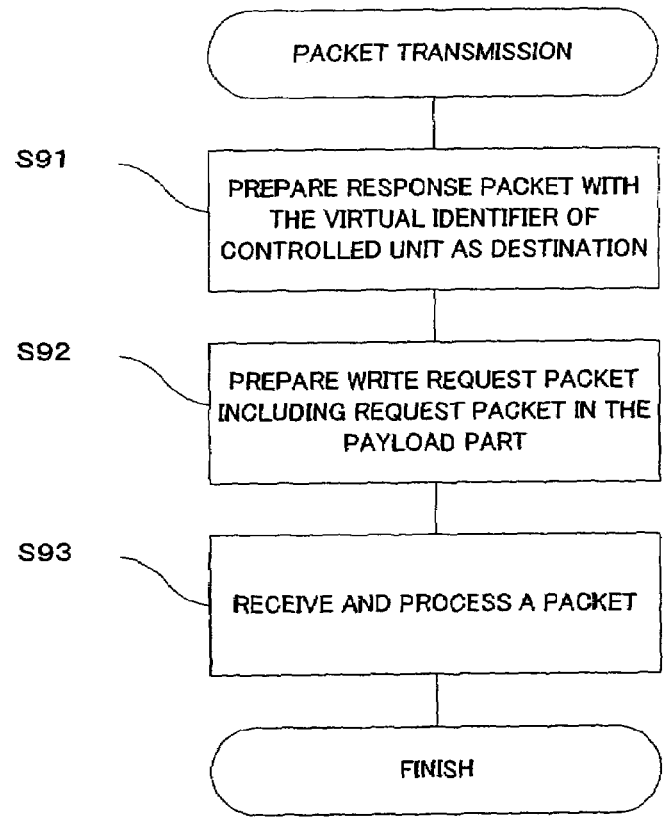
FIG. 12 is a diagram showing the packet transfer processing flow of a control unit according to the present invention.

Then, the equipment control means 122 of the control unit 117 prepares a response packet with the virtual identifier of the controlled unit 118 as destination ID (FIG. 12, Step S 91). A write request packet 213 as shown in FIG. 3(a) is prepared which contains the response packet in the data part (payload part) (FIG. 12, Step S 92), and then sent to the memory for transfer of the bus bridge 101 by packet send means 121 (FIG. 12, Step S 93). Then, destination ID 203 of the destination of the write request packet 213, label 204, rt 205 and pri 207 and ID 208 at source are identical with those of the read request packet 201. Also, to the data 215, a request packet to be sent is specified, and for the destination node ID of the request packet, the virtual identifier of the controlled unit 118 is used.

Figure 10:
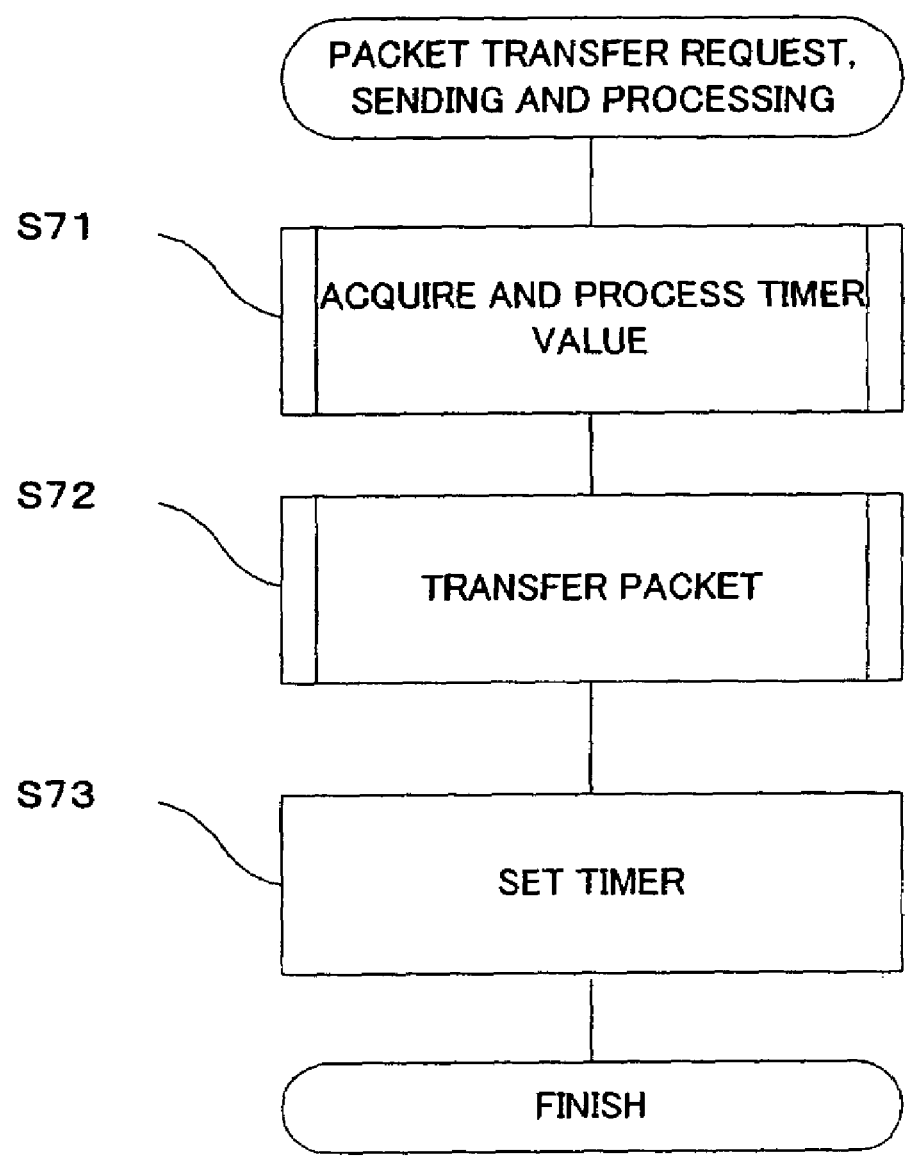
FIG. 10 is a diagram showing the packet transfer request send processing flow according to the present invention.
Figure 11:
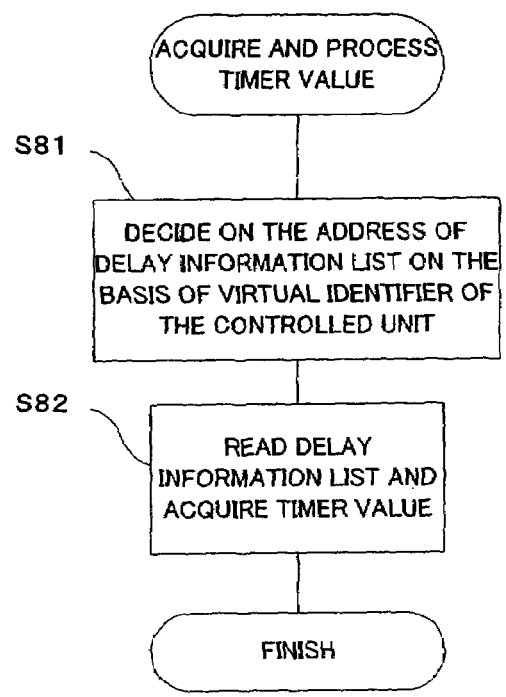
FIG. 11 is a diagram showing the timer value acquisition processing flow of the time out control apparatus according to the present invention.

In sending the write request packet 213, a timer management means 123 sets the timer on the basis of the delay time of the controlled unit 118 acquired as mentioned above to normally receive a response packet from the controlled unit 118 corresponding to the response packet of the payload part (FIG. 10, Step S 73).

Figure 13:
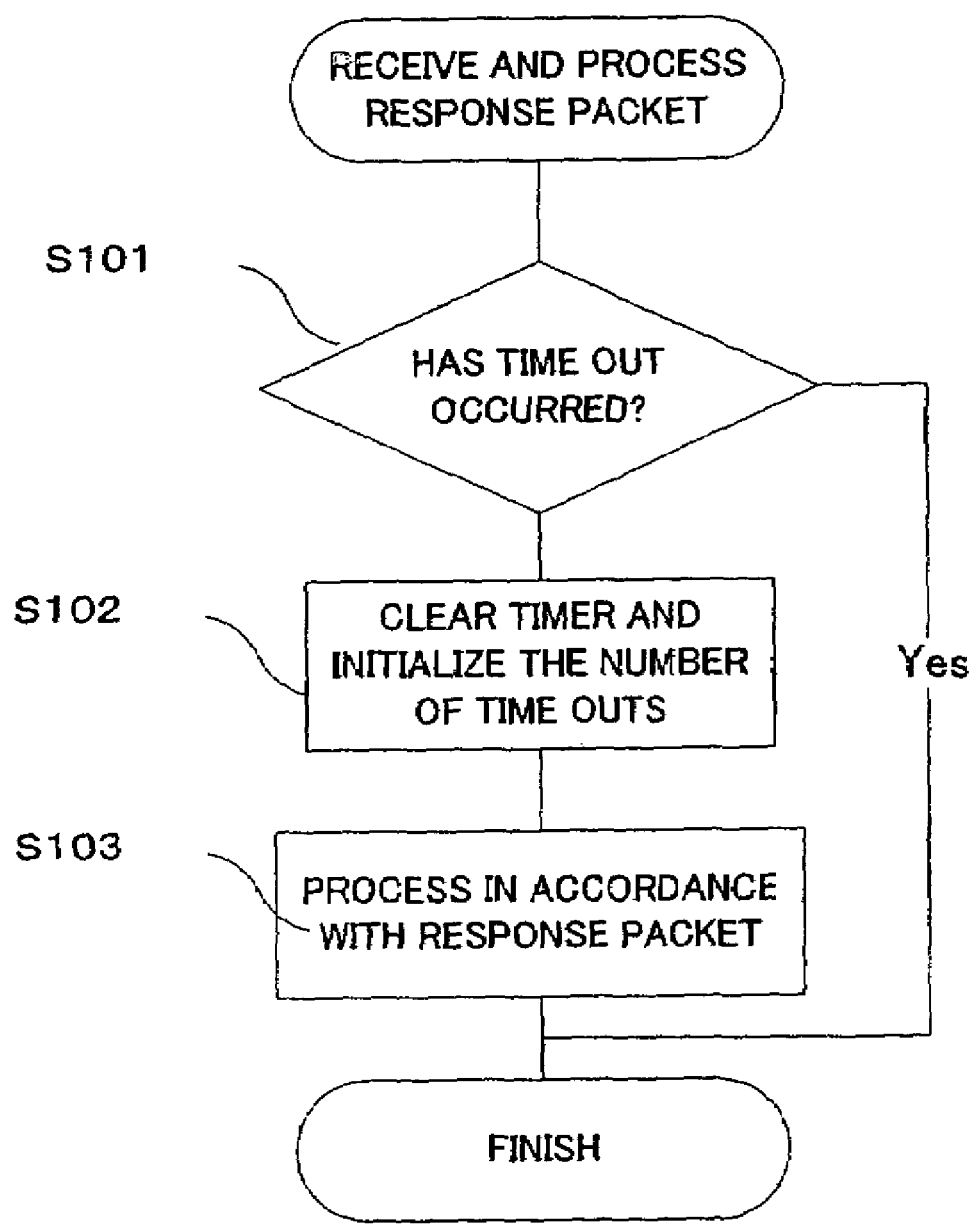
FIG. 13 is a diagram showing the response packet of the control unit according to the present invention.

Then, when a packet receive means 120 of the control unit 117 receives a response packet from the controlled unit 118, the timer management means 123 clears the timer if the timer is not timed out (FIG. 13, Step S 101-S 102). And, a procedure is done according to the response packet (FIG. 13, Step S 103).

If the timer times out before the response packet is received, the control unit 117 does a time out procedure (FIG. 9, Step S 67) the following way.

Figure 14:
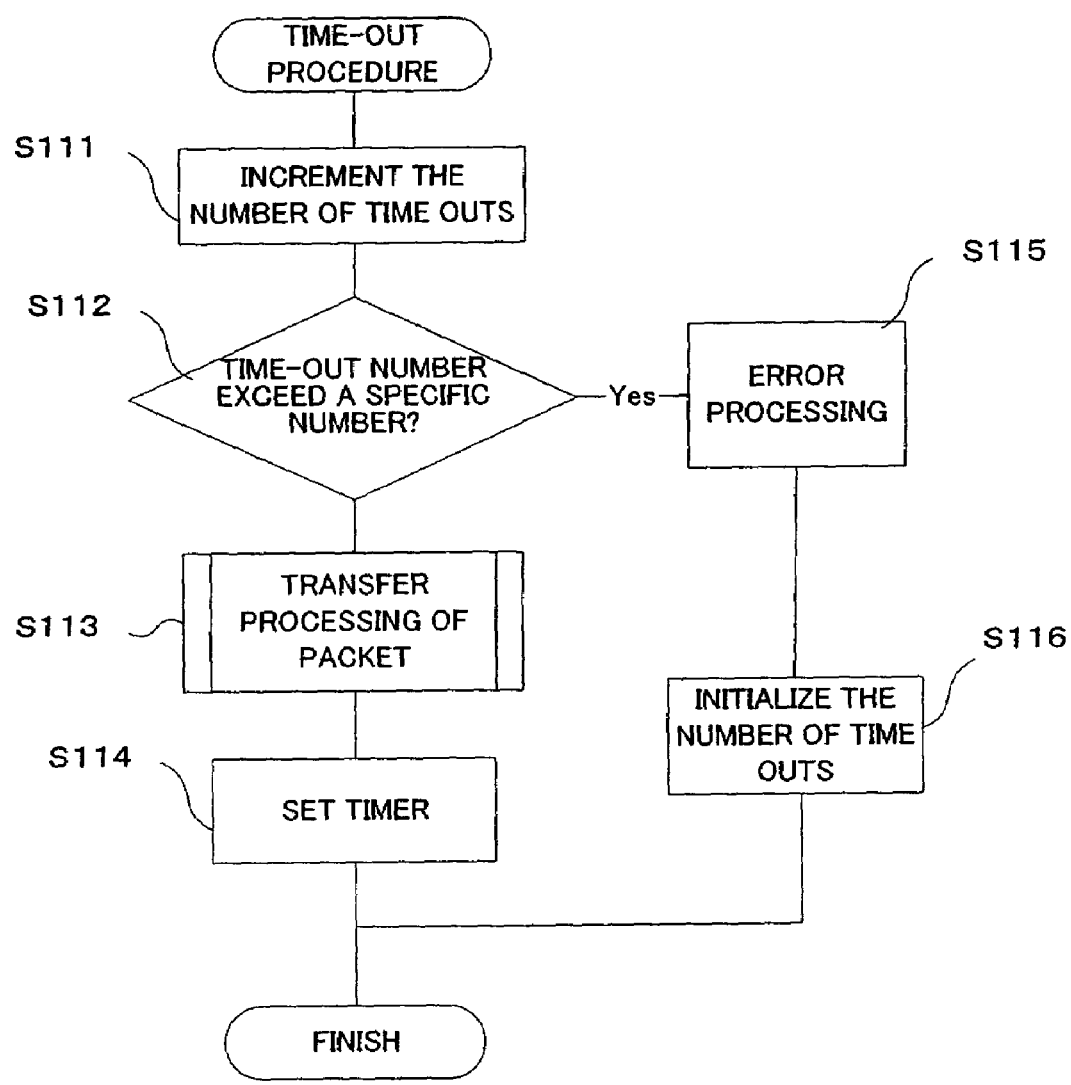
FIG. 14 is a diagram showing the time out processing flow of the control unit according to the present invention.

The control unit 117 re-sends response packets as mentioned above (FIG. 14, Steps S 113→S 114) within a predetermined number of times (FIG. 14, Steps S 111→S 112). In case a response packet is not received normally even if a request packet is re-sent a predetermined number of times (FIG. 14, Steps S 111→S 112), error procedures like initialization of the bus are done (FIG. 14, Step S 115).

Then, there will be explained the operation when the bus bridge 101 receives a read request packet 201 of the delay information list 112 from the control unit 117.

If the bus bridge 101 receives a read request packet 201 of the delay information list 112 from the control unit 117 by the first packet receiving means 104, the type of the packet is analyzed by the first packet analysis means 108 the same way as in the case of the self ID packet. If the first packet analysis means 108 finds the received packet to be a read request packet 201 of the delay information list 112, then that is notified to the information output means 119 of the bus bridge 101, and delay information procedures (FIG. 5, Step S 6) is done in the following way.

Figure 2:
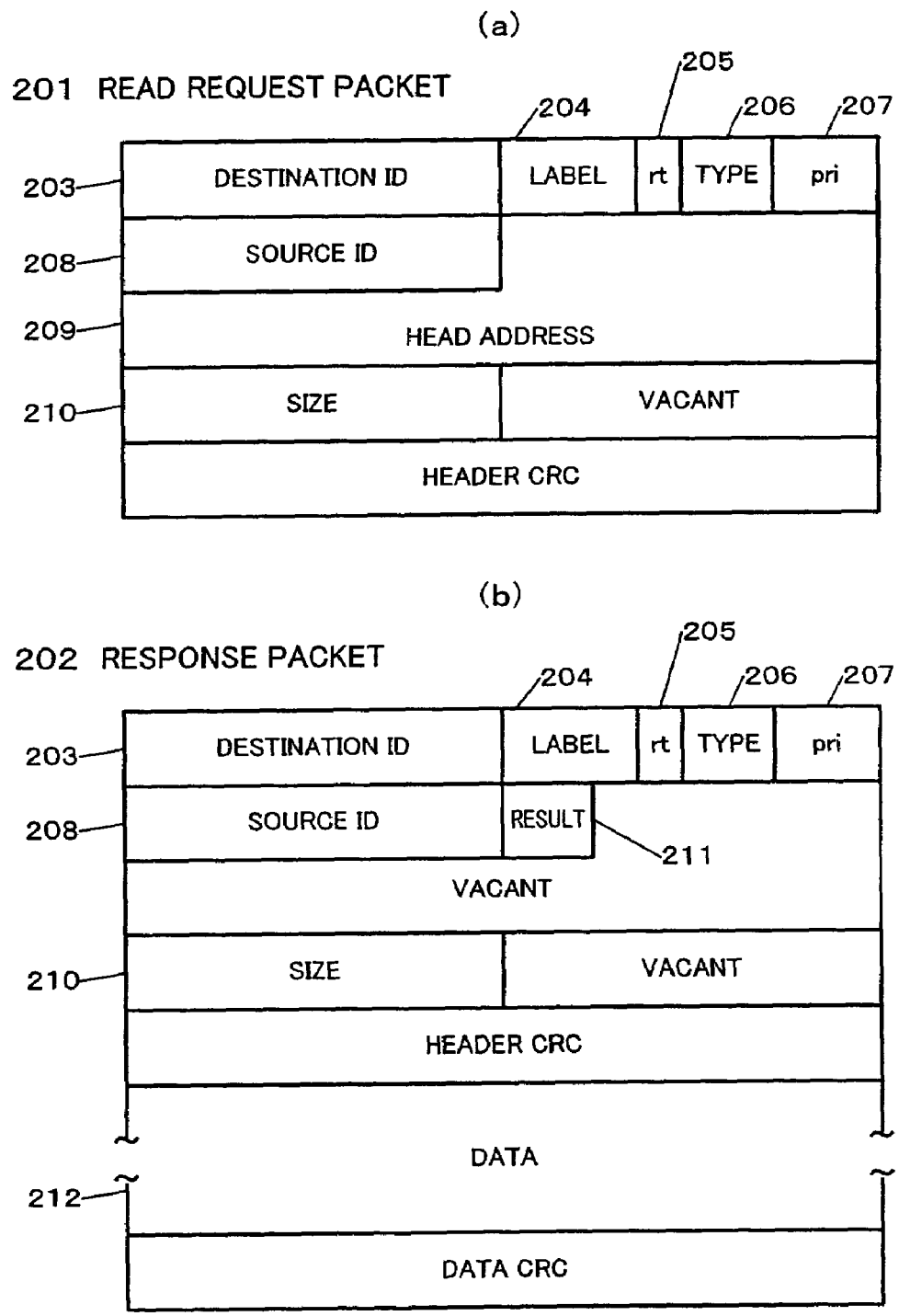
FIG. 2 is a schematic diagram of a read request packet and a read response packet used in the present invention.
Figure 7:
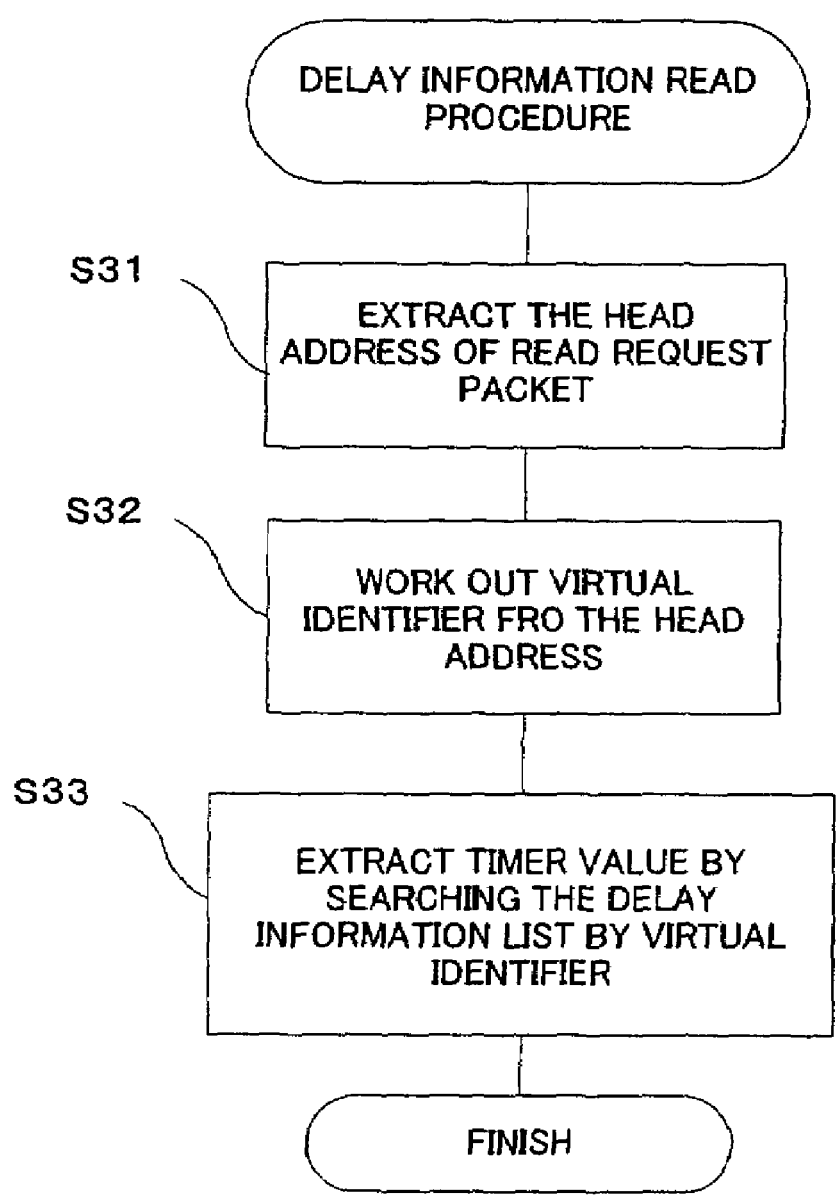
FIG. 7 is a diagram showing the delay information read flow of the time out control apparatus according to the present invention.

The information output means 119 extracts the head address 209 from the read request packet 201 (FIG. 7, Step S 31), and works out a virtual identifier of the controlled unit 118 (FIG. 7, Step S 32). Furthermore, the information output means 119 searches the delay information list by the virtual identifier to read out the delay time of the controlled unit 118 (FIG. 7, Step S 33). Then, a first packet sending means 105 sends the delay time to the control unit 117 using a response packet 202 as shown in FIG. 2(*b*).

In this case, the node ID of the control unit 117 is specified to the destination ID 203 of the response packet 202, and the ID of the bus bridge 101 is specified to the source ID 208. To a result 211, the results is specified as to whether the procedure for the read request packet 201 is successful or not. To data 212, the read-out result value, that is, the delay time is specified. The label 204, rt 205, pri 207 and seize 210 are treated the same way as the read-out read request packet 201.

In the following, there will be explained the operation when the bus bridge 101 receives a write request packet 213, a request to write on the memory for transfer, from the control unit 117.

Figure 3:
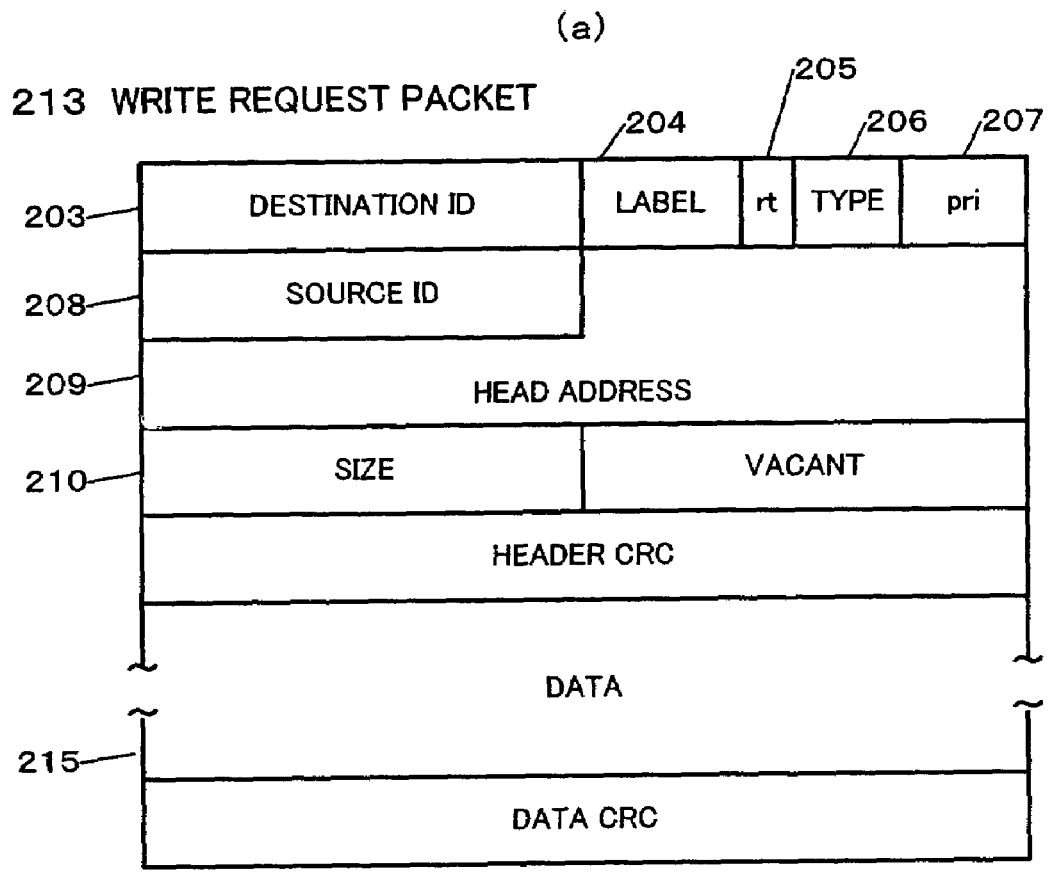
FIG. 3 is a schematic diagram of a write request packet and a write response packet used in the present invention.
Figure 3:
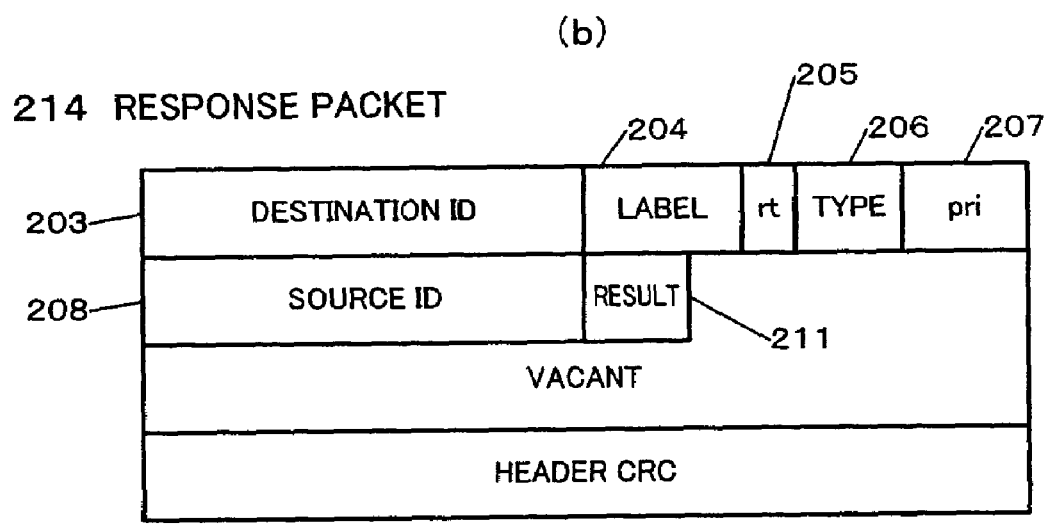

In the bus bridge 101, if the first packet receiving means 104 receives the write request packet 213, a request to write on the memory for transfer, then the packet type is analyzed by the first packet analysis means 108 as in the case of the self ID packet. If the first packet analysis means 108 finds that the received packet is a write request packet 213, a request to write on the memory for transfer, the write request packet is written on the memory for transfer. It is noted that the memory for transfer may be part of the address space of the memory 300 or a memory exclusively for transfer. At the same time, a response packet 214 as shown in FIG. 3(*b*) is sent to the control unit 117 by the first packet sending means 105. Also, a packet transfer procedure (FIG. 5, Step S 7), which will be described in the following, is done by a transfer means 115.

Figure 8:
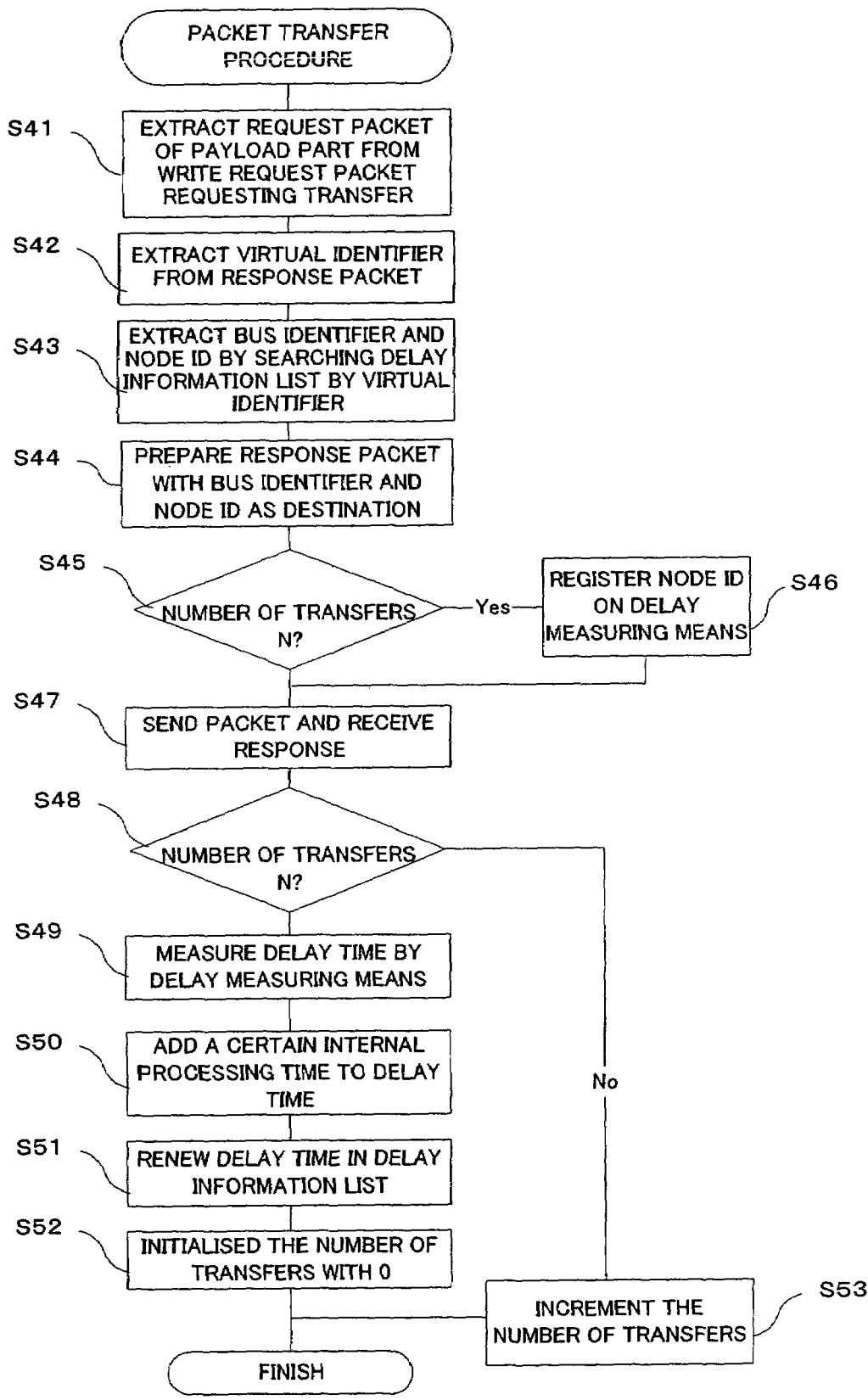
FIG. 8 is a diagram showing the packet transfer processing flow according to the present invention.

The first transfer means 115 extracts a response packet from the payload part of the write request packet written on the memory for transfer (FIG. 8, Step S 41). Then, the first transfer means 115 takes out the virtual identifier of the controlled unit 118 or the destination ID of the response packet, and searches the delay information list 112 on the basis of the virtual identifier via the information output means 119 to acquire the corresponding bus identifier and node ID (FIG. 8, Steps S 42→S 43). Furthermore, response packet with the bus identifier and node ID as destination is prepared and transferred to the second packet sending means 107 via internal bus 114 (FIG. 8, Step S 44).

The second packet sending means 107 sends the request packet to the controlled unit 118 and receives a response packet from the controlled unit 118 through the second packet receiving means 106. This response packet uses the virtual identifier of the control unit 117 as an address and is contained in the payload part of the write request packet 213 the controlled unit 118 sends. Furthermore, the write request packet 213 is to be written on the memory for transfer. And the bus bridge 101 that receives the write request packet 213 does a procedure to send the response packet to the control unit 117—the same procedure as in the case of the write request packet 213 that the control unit 117 sends (FIG. 8, Step S 47).

Furthermore, the first transfer means 115 sends notice to the delay measuring means 110 every time request packets received from the control unit 117 are transferred a specific number of times. In this case, the delay measuring means 110 registers the destination node ID in the same way as mentioned above (FIG. 8, Step S 46), and measures the delay time requires for one response packet to be received after the request packet is sent (FIG. 8, Step S 49). In addition, the delay measuring means 110 adds a specific internal processing time in the bus bridge 101 to the delay time measured as mentioned above (FIG. 8, Step S 50). According to the delay time thus worked out, the delay information list generating means 111 renews the delay time for the node ID (FIG. 8, Step S 51) and the number of transfers is initialized with 0 (FIG. 8, Step S 52).

It is all right if the delay time is not renewed every time a specific number of transfers are effected. But renewing the delay time as mentioned above makes it possible to provide the control unit 117 with the optimum timer value against fluctuations in processing time due to changes in the state of the controlled unit 118. The interval at which measurements are taken is prolonged in case it is desired to decrease the overhead to the bus bridge 101 or in case there is not much change in the processing time at the terminal unit to be connected to. On the other hand, the interval can be changed and shortened, in case the overhead can be ignored or in case the processing time of the terminal unit to be connected changes frequently.

As set forth above, the control unit 117 acquires the delay time from the delay information list 112 of the bus bridge 101 and sets the time as timer value, whereby it is possible to do an optimum time out procedure corresponding to the fluctuation in processing time due to the change in the state of every controlled unit.

Embodiment 2

In Embodiment 1, it is a prerequisite that the terminal unit is provided with timer value acquisition means to acquire the timer value and timer management means to manage the timer value. In reality, however, all the terminal units are not capable of acquiring the timer value by themselves. It can happen that a terminal unit that acquires the time out value by itself and a terminal unit that cannot acquire the time out value by itself are connected on a bus at the same time. The terminal units that cannot acquire time out values cannot transfer a packet through the bus bridge. Therefore, the prerequisite is transfer of packets between the terminal units connected to the same bus.

Figure 15:
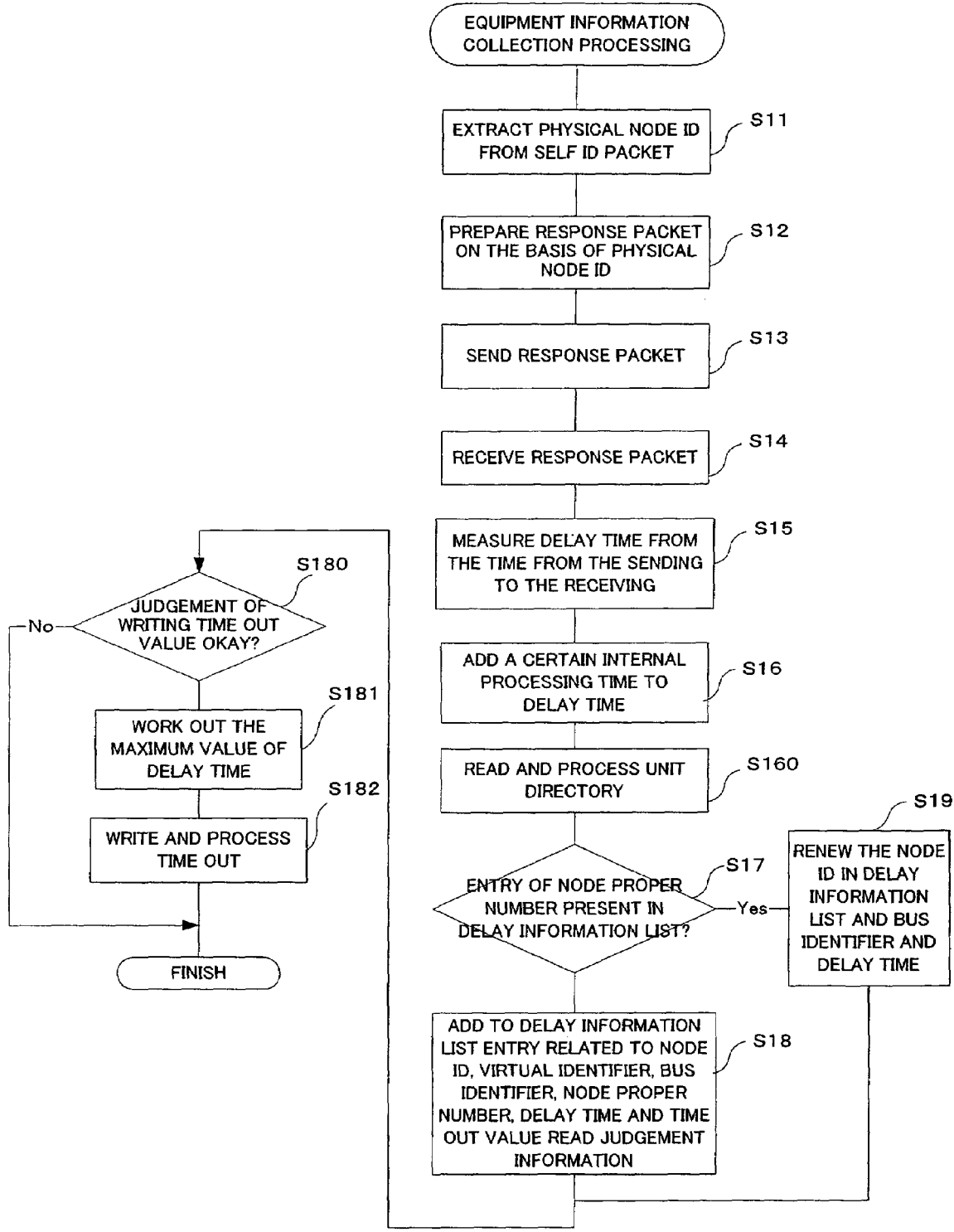
FIG. 15 is a diagram showing another equipment information collection processing flow of the time out control apparatus according to the present invention.

FIG. 15 shows the procedure for collection of equipment information in such a case (corresponding to FIG. 6).

In the equipment information collection shown in FIG. 6, after the procedure for working out the delay time is completed (FIG. 6, Step S 16), the delay measuring means 110 prepares a response packet to read the ROM unit directory in which the components of the terminal unit are written on the basis of the self ID, and transfers the response packet to the terminal unit. Thereby, the terminal unit side returns to the bus bridge 101 a response to the request. Receiving this response, the delay measuring means 110 can judge if the terminal unit is equipped with the timer value acquisition means and timer management means. The judgement is notified to the delay information list generating means 111. And in the writing procedure (FIG. 15, Step S 18), the delay information list generating means 111 writes—whether the terminal unit is a terminal unit where the time out value is written or not (flag) in the delay information list 112 by relating the proper identification information on the respective terminal units 117—or renews.

When preparation or renewal of the delay information list 112 is completed, notice to the effect that "a delay information list is prepared (renewed)" is served from the delay information list generating means 111 to the information output means 119, and at the same time the self ID is handed over. On receiving the notice, the information output means 119 refers to the contents of the self ID and delay time list and judges whether the terminal unit is a terminal unit requesting the writing of the time out value (FIG. 15, Step S 180). Here, in case the terminal unit requires the writing of the time out value, the forecast maximum value of the delay time to write is worked out, and its value is to be written on the time out register 310 of the terminal unit corresponding to the self ID (FIG. 15, Steps S 181→S 182).

In the terminal unit not equipped with timer value acquisition means, it is so arranged that the time-out value, first from the time out control apparatus, is registered with the time out register 310. In sending the response packet, there is no read request.

Embodiment 3

Figure 16:
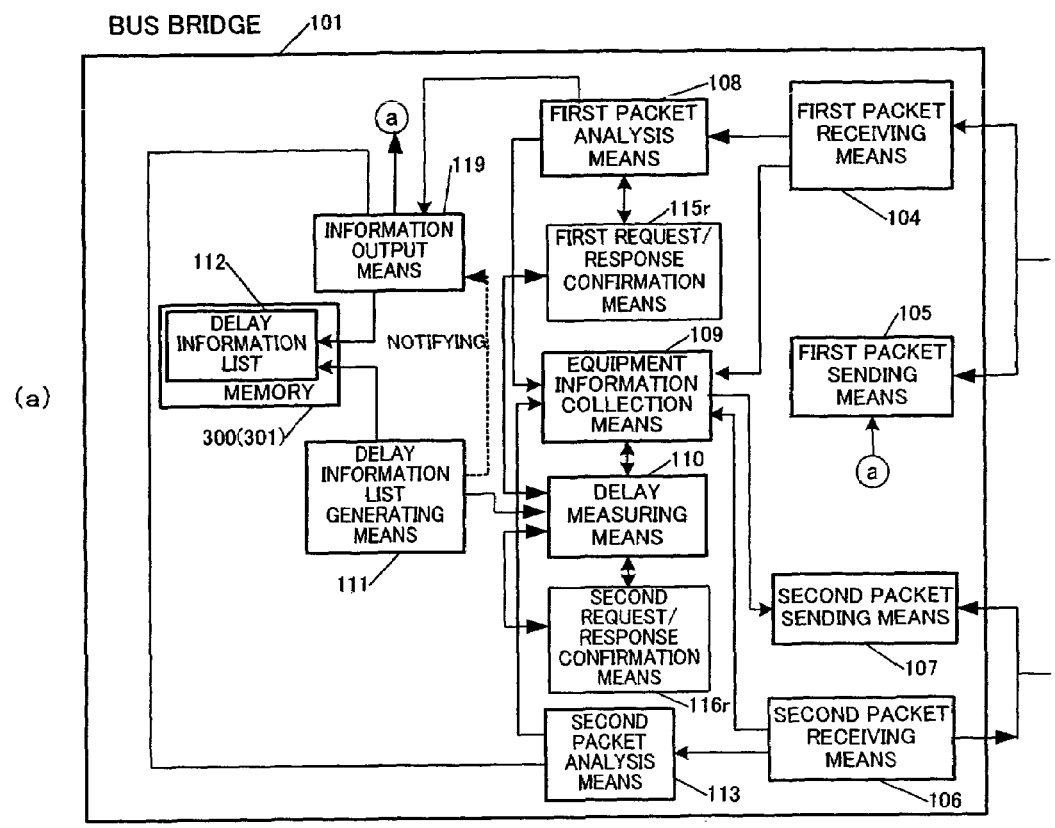
FIG. 16 is a diagram showing a first embodiment with a bus bridge and a time out control apparatus separated according to the present invention.
Figure 16:
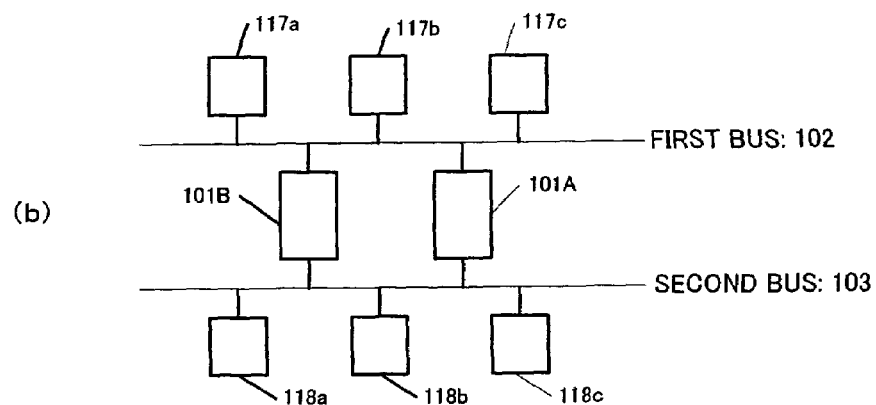

The preceding embodiments are so constituted that a time out control apparatus is built in a bus bridge that makes it possible to transfer packets between different buses. In the present invention, however, it is not always necessary to so form the time out control apparatus and the bus bridge integrally. FIG. 16(a) shows arrangements of a time out control apparatus separate from the bus bridge. FIG. 16(b) is its connection diagram. That is, the first bus 102 to which terminal units 117a, 117b and 117c are connected and the second bus 103 to which terminal units 118a, 118b and 118c are connected are connected by a bus bridge 101A without a time out control function, and at the same time, a bus bridge 101B is additionally connected between the buses.

In the above arrangements, the process that the delay information list generating means 111 prepares a delay information list 112 is common to all the embodiments. But in this time out control apparatus, packets are not transferred. That is, it is so constituted that a first request/response confirmation means 115r and second request/response confirmation means 116r are provided in place of the first transfer means 115 and second packet transfer means 116.

In the above arrangements, the process to generate delay information list 112 (FIG. 6) and the read request process (FIG. 7) to acquire virtual identifier etc. of the controlled unit are identical with the above and will not be explained. The packet transfer process (FIG. 8) is effected by the bus bridge 101A, and there is no need for the procedure to send response packets by the first transfer means 115 (FIG. 8, Step S 44) and the procedure for sending a response packet (first half of S 47).

Furthermore, when receiving a destination node ID given by the first request/response confirmation means 115r and the response packet from the destination node, the delay measuring means 110 measures the delay time on the basis of the source node ID given from the second request/response confirmation means 116r and renews the delay information list 112.

The other details are identical with those of Embodiments 1 and 2.

Embodiment 4

In Embodiments 1 and 2, the time out procedure between the terminal units are connected to two different buses. In the time out procedure between the terminal units that can not be adapted for the bus bridge (not provided with the timer value acquisition means 124), it is possible to so constitute that the time out control apparatus is connected on the bus with which terminal units are connected as shown in FIG. 17(a), (b).

That is such a case where the time out control apparatus 101C is connected on the first bus 102 to which the terminal units 117a, 117b and 117c are connected or in case or such a state where the first bus to which the terminal units 117a, 117b and 117c and the second bus 102 to which the terminal units 118a, 118b, 118c are connected are connected by the time-out control unit 101E (in this case, it is understood that the time-out control unit 101E is provided with a bus connection function and a time out control function corresponding to the bus bridge) and where a time out control unit 101C to control the time out of the terminal units that can not be adapted for the bus bridge is connected to the bus 102, and a time-out control unit 101D is connected to bus 103.

The time-out control unit 101C or time-out control unit 101D in that case are so constituted that there are provided only the elements corresponding to only one of the buses as shown in 18.

In this arrangement, the equipment information collection when a bus reset occurs is the same as the procedure shown in FIG. 15. Here, however, the time out control apparatus sees only packets flowing in the bus to which the time out control apparatus itself is connected, and therefore no virtual identifier or bus identifier is needed.

Figure 19:
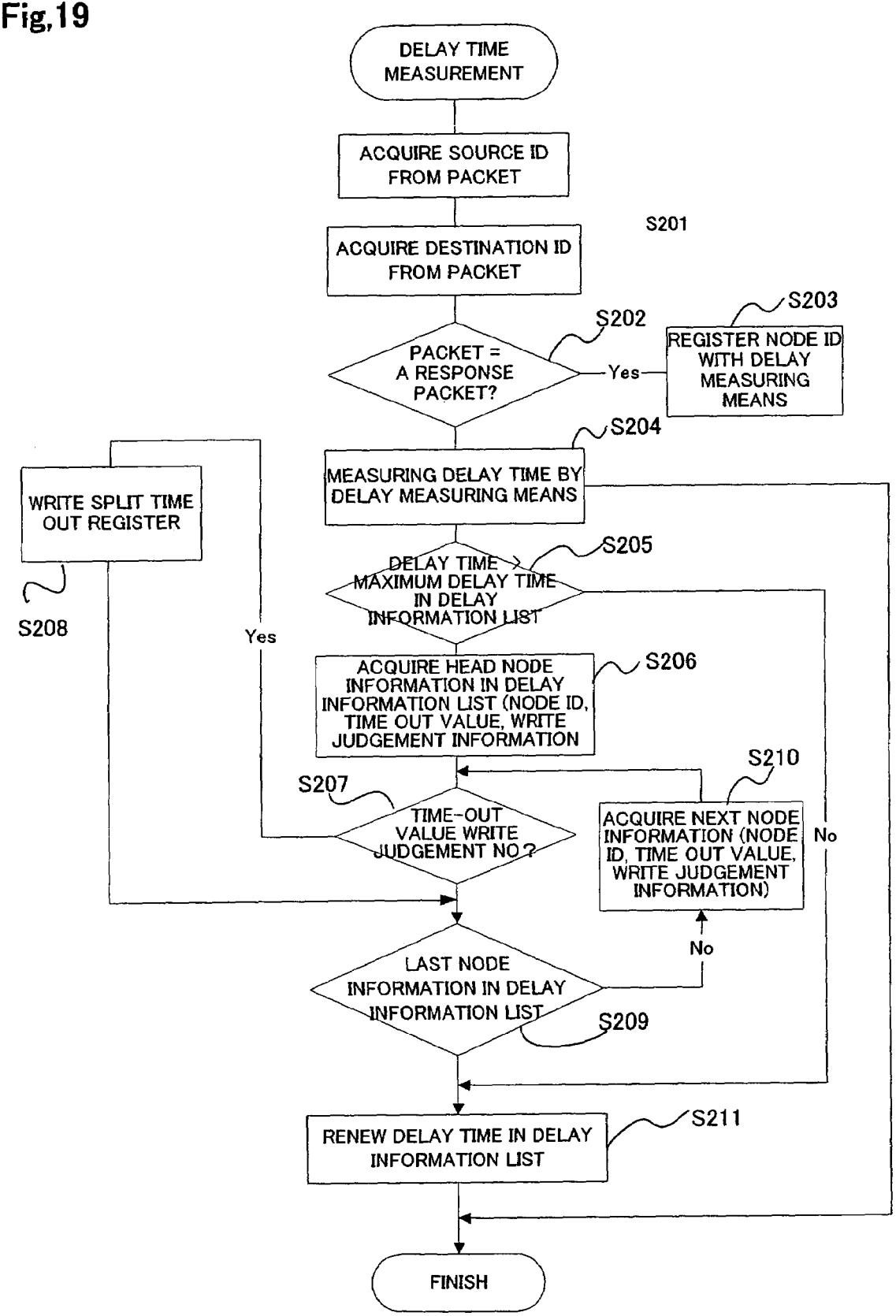
FIG. 19 is a flow diagram showing the time out control process of a terminal unit not corresponding to the bus bridge.
Figure 20:
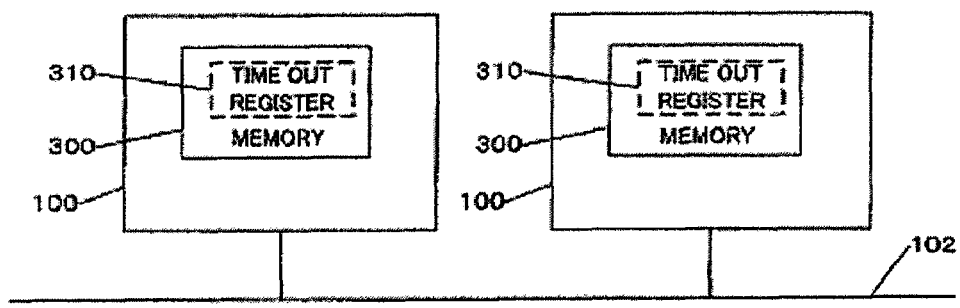
FIG. 20 is a diagram showing the prior art connection of the terminal unit to the bus.
Figure 21:
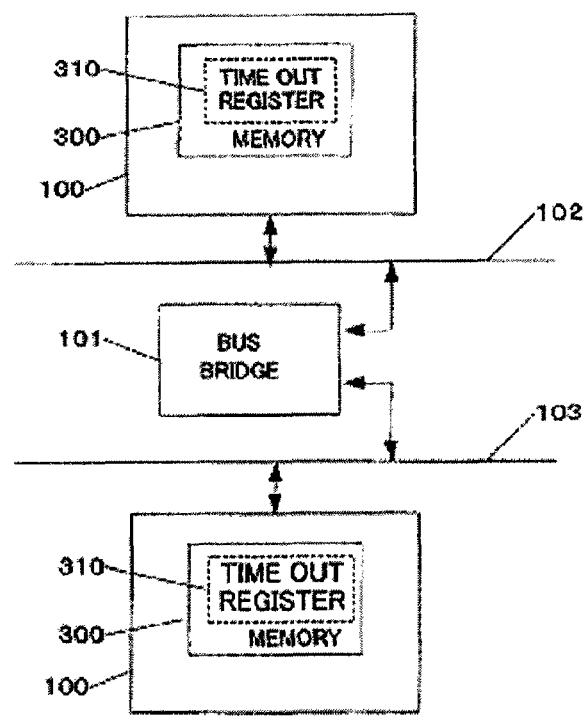
FIG. 21 is a diagram showing the prior art connection of the terminal unit using the prior art bus bridge.

Then, when a packet transfer request is issued from a specific terminal unit as shown in FIG. 19, delay time measurement is done. That is, the first packet analysis means 108 acquires source and destination node ID's from the sent packet and judges if the packet is a request packet from the control unit to the controlled unit (FIG. 19, Steps S 201→S 202). If the packet is a request packet, the above-mentioned source and destination node ID's are registered with the delay measuring means 110 (FIG. 19, Step S 203). Then, if the packet is judged to be a response packet in a judgement of the packet type, the delay measuring means 110 measures the delay time needed for the response packet to return from the controlled unit after the request packet is sent out from the control unit (FIG. 19, Step S 204).

Here, it is judged if the delay time thus measured is larger or smaller than the maximum delay time in the delay time list first prepared. If the delay time is smaller, then the contents in the delay information list generating means 111 will be re-written according to the value thus obtained by the measurement (FIG. 19, Steps S 205→S 211).

In case the delay time thus measured is larger than the maximum delay time in the delay time list first generated, time out less occurs if a measured value is adopted, and therefore the contents in the time out register 310 are renewed or replaced with the value obtained above, and the contents in the delay information list generating means 112 is rewritten (see FIG. 19, Steps S 206-S 210→S 211).

Figure 17:
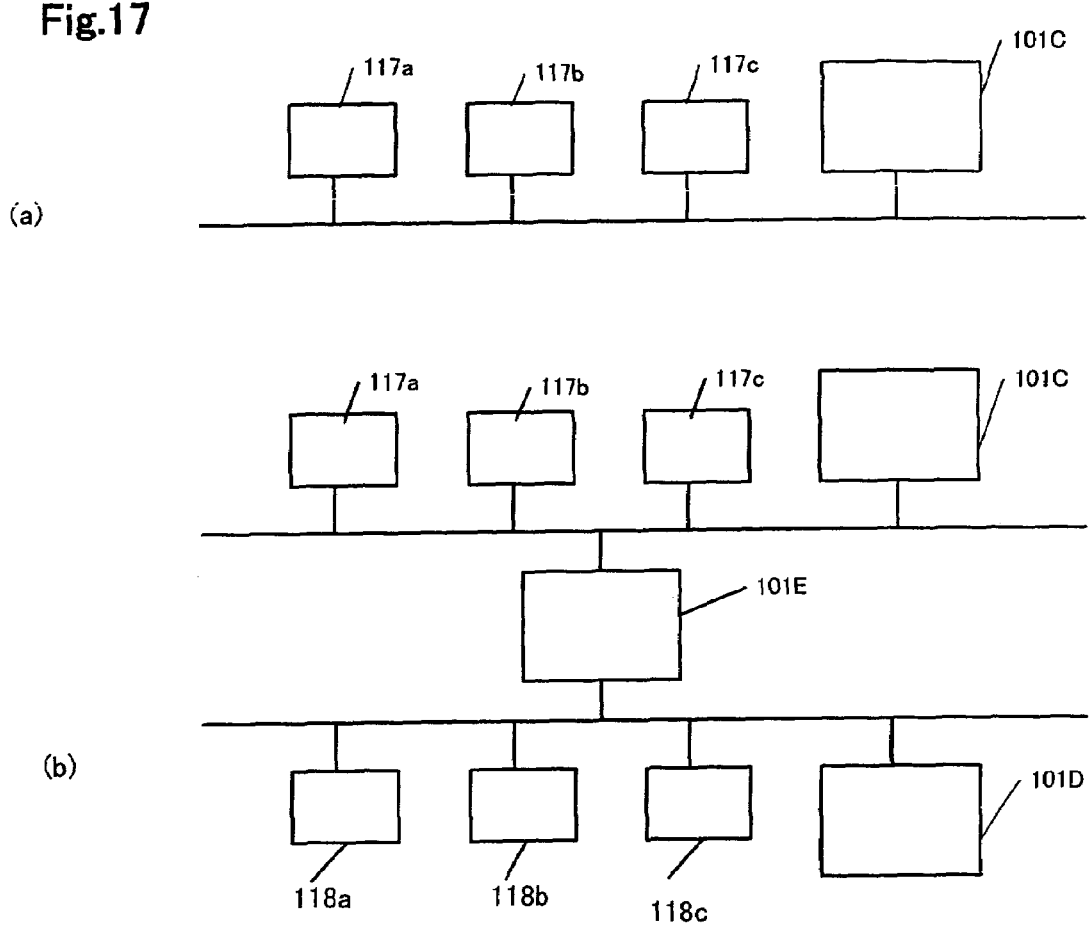
FIG. 17 is a connection diagram of the time out control apparatus of a terminal unit not corresponding to the bus bridge.
Figure 18:
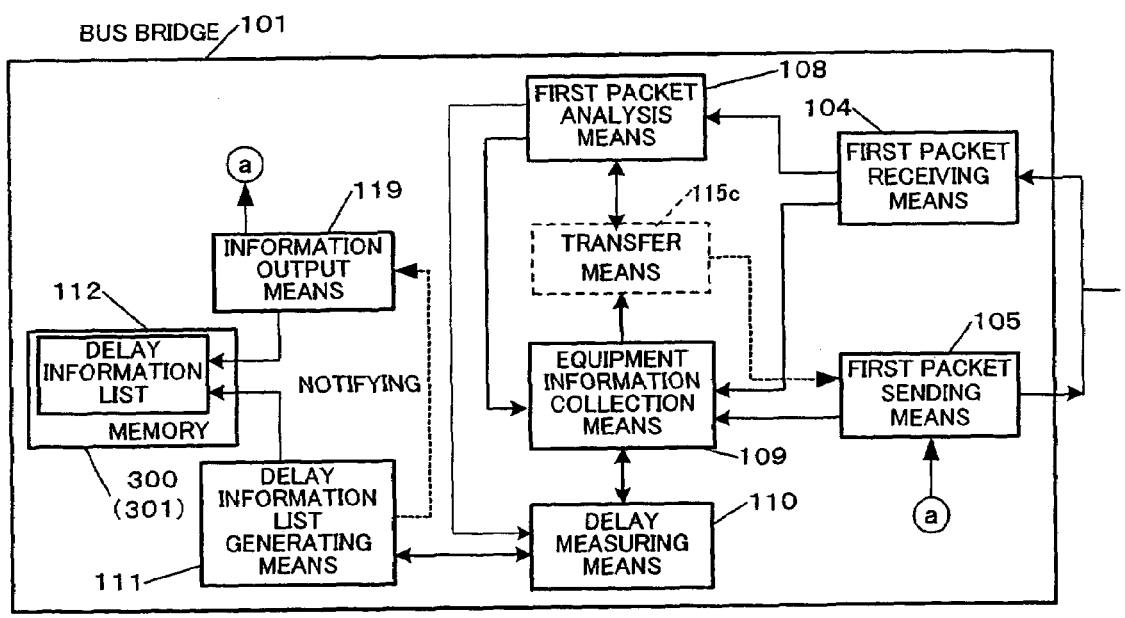
FIG. 18 is a constitutional diagram of the time out control apparatus of a terminal unit not corresponding to the bus bridge.

In the configuration shown in FIG. 17, a packet transfer from a specific terminal unit and another specific terminal unit on the same bus may be effected through the transfer means 115c indicated by dotted line in FIG. 18 if those two terminal units can acquire time-out values by themselves. Or whether the terminal units can acquire time-out values by themselves or not, the packet may be directly transferred between the terminal units.

Furthermore, the judgement whether "time out write judgement is ON" (FIG. 15, Step S 180; FIG. 19, Step S 207) shown in FIG. 15 and FIG. 19 judges if the object terminal unit corresponds to the bus bridge. That is, in case the terminal unit corresponds to the bus bridge, there will be no need of time out writing (FIG. 15, Step S 182; FIG. 19, Step S 208).

While the bus bridge of IEEE 1394 only has been described, the present invention is not limited thereto but is applicable to a bus bridge having a similar function.

In the present invention as set forth above, the bus bridge connecting a plurality of buses measures delay times required for transfer of packets, which are provided as a list. The terminal unit capable of acquiring the delay time thus provided reads the timer value from the list on to the time out register and sets this timer value on the timer for receiving the response packet. Thus, without setting a timer value longer than necessary, time out procedure can be done efficiently.

In the terminal unit not capable of acquiring the delay time, it is so arranged that the timer value is written on the time out register of the terminal unit from the bus bridge.

Also, by measuring the delay time every time packets are transferred through the bus bridge a specific number of times, it is possible to provide the optimum timer value corresponding to fluctuation in processing time due to the change in the state of the destination terminal unit.

Furthermore, by including in the delay time the internal processing time required for the bus bridge to be transferred, it is possible to provide a real timer value to the terminal unit requiring the transfer of a packet.

What is claimed is:

1. A time out control apparatus for control of time out in transfer of packets between terminal units connected to a plurality of buses, the apparatus comprising:
 a measuring unit operable to measure the time required for a response packet to be received after the sending of a request packet to a terminal unit connected via a bus;
 a list generating unit operable to generate a list by relating proper identification information on the respective terminal units connected via a bus to the response time measured by the measuring unit; and
 an information outputting unit operable to read out the response time from the list in accordance with a request from the respective terminal unit and outputting the response time to the respective terminal unit.

2. The time out control apparatus as defined in claim 1, wherein the information outputting unit reads out the maximum value of the response time from the list when the list is generated and outputs the value to the terminal unit.

3. The time out control apparatus as defined in claim 1, wherein the proper identification information on the respective terminal units includes information to judge by the measuring unit if the terminal unit can acquire the response time or not,
 the response time in accordance with a request from the terminal unit is output when the terminal unit can acquire the response time, or the response time is registered to the terminal unit when the terminal unit can not acquire the response time.

4. The time out control apparatus as defined in claim 1, wherein the measuring unit generates response time in the list by measuring response time required to receive a response packet in answer to a request packet sent to acquire proper identification information of the terminal unit in initializing the bus.

5. The time out control apparatus as defined in claim 1, wherein the measuring unit measures the response time required for a response packet to be received a specific number of time, and the response time in the list is renewed.

6. The time out control apparatus as defined in claim 1, wherein the response time includes the internal processing time in a bus bridge, the time required for transfer of the request packets and response packets.

7. The time out control apparatus as defined in claim 1, wherein the measuring unit, the list generating unit and the information outputting unit are provided inside the bus bridge mediating buses.

8. A terminal unit adopted to a time out control system for control of time out in transfer of packets between terminal units connected to buses, the terminal unit comprising:
 a timer value acquisition unit operable to acquire the response time held in a time out control apparatus when the packets are sent to another terminal unit connected via the buses; and
 a timer management unit operable to manage the time out processing in transferring the packets on the basis of the response time acquired from the time out control apparatus.

9. A time out control system for control of time out in transfer of packets between terminal units connected to buses, the system comprising:
 a time out control apparatus including:
  a measuring unit operable to measure response time required for a response packet to be received after a request packet is sent to a terminal unit;
  a list generating unit operable to generate the list by relating proper identification information of the respective terminal units connected via the bus to the response time measured by the measuring unit; and
  an information outputting unit operable to read the response time from the list in accordance with a request from the terminal unit and outputting the response time to the terminal unit; and
 the terminal unit comprising:
  a timer value acquisition unit operable to acquire the response time of another terminal unit from the time out control apparatus when a packet is sent to the other terminal unit connected via the bus; and a timer management unit operable to carry out time out procedures in transferring the packet on the basis of the response time acquired from the time out control apparatus.

10. The time out control system as defined in claim 9, wherein the information outputting unit reads out the maximum value of the response time from the list when the list is generated and outputs the value to the terminal unit.

11. A time out control method for controlling the time out in transfer of packets between terminal units connected to buses, the method comprising:

measuring a response time required for a response packet to be received after the sending of a request packet to the terminal units connected via the bus;

generating a list by relating to the proper identification information of the respective terminal units connected via the bus to the response time measured by the measuring unit; and outputting the response time read from the list to the respective terminal unit.

* * * * *